US008675621B2

(12) United States Patent
Fang et al.

(10) Patent No.: US 8,675,621 B2
(45) Date of Patent: Mar. 18, 2014

(54) USING IDENTIFICATION SEQUENCES IN WIRELESS COMMUNICATION SYSTEMS

(75) Inventors: Yonggang Fang, San Diego, CA (US); Wenfeng Zhang, San Diego, CA (US); Rajesh Bhalla, Westmont, IL (US); Xiaowu Zhao, Shenzhen (CN)

(73) Assignee: ZTE (USA) Inc., Morristown, NJ (US)

( * ) Notice: Subject to any disclaimer, the term of this patent is extended or adjusted under 35 U.S.C. 154(b) by 715 days.

(21) Appl. No.: 12/486,715

(22) Filed: Jun. 17, 2009

(65) Prior Publication Data

US 2010/0029278 A1 Feb. 4, 2010

Related U.S. Application Data

(60) Provisional application No. 61/078,754, filed on Jul. 7, 2008, provisional application No. 61/090,201, filed on Aug. 19, 2008.

(51) Int. Cl.
*H04W 4/00* (2009.01)
*H04W 36/00* (2009.01)

(52) U.S. Cl.
USPC .......................... 370/338; 370/331; 455/436

(58) Field of Classification Search
None
See application file for complete search history.

(56) References Cited

U.S. PATENT DOCUMENTS 6,101,176 A * 8/2000 Honkasalo et al. ........... 370/335
2008/0318576 A1* 12/2008 So et al. ....................... 455/436
2010/0260068 A1* 10/2010 Bhatt et al. ................... 370/254

* cited by examiner

*Primary Examiner* — Afshawn Towfighi
(74) *Attorney, Agent, or Firm* — Perkins Coie LLP

(57) ABSTRACT

Techniques, apparatuses, and systems for using identification sequences in a wireless communication system can include receiving information indicative of a pilot code detected by a wireless device, the pilot code being shared by multiple Femto Access Points (FAPs) that each provide wireless service in at least a portion of the coverage area; receiving information indicative of an identification sequence detected by the wireless device that is associated with the pilot code, using the information indicative of the identification sequence to identify one of the FAPs that share the pilot code; and performing a hand-off of the call to the identified FAP to continue to provide wireless service for the call via the identified FAP.

32 Claims, 10 Drawing Sheets

USING IDENTIFICATION SEQUENCES IN WIRELESS COMMUNICATION SYSTEMS

CROSS REFERENCE TO RELATED APPLICATIONS

This document claims the benefit of the priority of U.S. Provisional Application Ser. No. 61/078,754, filed Jul. 7, 2008 and entitled "Using Special Pilot To Identify Hand-In Femto Cell For Wireless Communication Networks," the entire contents of which are hereby incorporated by reference. This document additionally claims the benefit of the priority of U.S. Provisional Application Ser. No. 61/090,201, filed Aug. 19, 2008 and entitled "Using Special Pilot To Identify Hand-In Femto Cell For Wireless Communication Networks," the entire contents of which are hereby incorporated by reference.

BACKGROUND

This document relates to wireless communication systems.

Wireless communication systems can include a network of one or more base stations to communicate with one or more wireless devices such as a mobile device, cell phone, wireless air card, mobile station (MS), user equipment (UE), access terminal (AT), or subscriber station (SS). Base station (BS) can emit radio signals that carry data such as voice data and other data content to wireless devices. In various wireless communication systems, wireless coverage can be divided into many geographic areas, called cells. A base station can provide wireless service in one or more cells to one or more wireless devices. Various examples of cells include macro cell, micro cell, and pico cell, which can differ in size and capacity.

A femto cell is a smaller scale cell that can provide wireless service to homes, businesses, and areas which may not be adequately covered by a macro cell or a different cell in a wireless communication system. A base station that provides wireless service for one or more femto cells can be referred to as a Femto Access Point (FAP). A FAP can connect to a wireless operator's core network equipment via a backhaul connection. A FAP can use wired or wireless broadband connection at home or business, e.g., ADSL, cable modem, fiber, wireless microwave, wireless interoperability for microwave access (WiMAX) technologies, as a backhaul connection. When a wireless device enters a femto cell coverage area, the wireless device can communicate with the associated FAP over a wireless air interface technology and can receive services from the same wireless operator via the broadband backhaul connection of the FAP.

A base station and a wireless device can wirelessly communicate using one or more wireless air interface technologies such as those defined in 3GPP2, 3GPP, and IEEE 802.16 specifications. Various examples of air interface technologies include Code Division Multiple Access (CDMA), CDMA2000, High Rate Packet Data (HRPD), Universal Mobile Telecommunications System (UMTS), and WiMAX.

SUMMARY

This document describes technologies, among other things, for using identification sequences in wireless communication systems.

In one aspect, techniques for operating a base station in a wireless communication system can include providing wireless service to wireless devices in a coverage area; transacting a call with a wireless device; receiving information indicative of a pilot code detected by the wireless device, the pilot code being shared by multiple Femto Access Points (FAPs) that each provide wireless service in at least a portion of the coverage area; receiving information indicative of an identification sequence detected by the wireless device that is associated with the pilot code, using the information indicative of the identification sequence to identify one of the FAPs that share the pilot code; and performing a hand-off of the call to the identified FAP to continue to provide wireless service for the call via the identified FAP. The wireless device can detect different portions of the identification sequence over different periods of time. Other implementations can include corresponding systems, apparatus, and computer programs, configured to perform the actions of the techniques, encoded on computer readable mediums.

These and other implementations can include one or more of the following features. An identification sequence can include two or more Pseudorandom Noise (PN) sequences in two or more different transmission frames. An identification sequence can include two or more Walsh codes modulated on a Pseudorandom Noise (PN) sequence over different periods of time. Receiving information indicative of the pilot code can include receiving information indicative of the identification sequence. Some implementations can include operating the FAPs to each transmit a different identification sequence and transmitting assistance information to the wireless device to assist the wireless device in detecting one or more identification sequences. Receiving information indicative of the identification sequence can include receiving a value that corresponds to a FAP. Receiving information indicative of the identification sequence can include receiving different time indices and information detected by the wireless device during the time periods associated the time indices.

In another aspect, wireless communication systems can include two or more Femto Access Points (FAPs) configured to provide wireless service to wireless devices in different portions of a coverage area and transmit different identification sequences and a base station in communication with the two or more FAPs, configured to perform operations. The two or more FAPs can share a pilot code. The operations can include providing wireless service to wireless devices in the coverage area; transacting a call with a wireless device; receiving information indicative of a detected pilot code from the wireless device; receiving information indicative of a detected identification sequence from the wireless device, the detected identification sequence being associated with the detected pilot code; using the information indicative of the detected identification sequence to identify one of the two or more FAPs; and performing a hand-off of the call to the identified FAP to continue to provide wireless service for the call via the identified FAP. The wireless device can detect different portions of the detected identification sequence over different periods of time.

In yet another aspect, apparatuses and systems for wireless communications can include transceiver electronics to communicate with wireless devices in a coverage area; and processor electronics, in communication with the transceiver electronics, configured to perform operations. The operations can include transacting a call with a wireless device; operating the transceiver electronics to receive information indicative of a pilot code detected by the wireless device, the pilot code being shared by multiple Femto Access Points (FAPs) that each provide wireless service in at least a portion of the coverage area; operating the transceiver electronics to receive information indicative of an identification sequence detected by the wireless device that is associated with the pilot code, where the wireless device detects different portions of the identification sequence over different periods of time; using the information indicative of the identification sequence to identify one of the FAPs that share the pilot code; and performing a hand-off of the call to the identified FAP to continue to provide wireless service for the call via the identified FAP.

In yet another aspect, apparatuses and systems for wireless communications can include transceiver electronics configured to communicate with wireless devices in a coverage area and transmit a signal indicative of a pilot code and processor electronics, in communication with the transceiver electronics, configured to perform operations. The pilot code can be shared by multiple base stations that provide wireless service to wireless devices in different portions of the coverage area. The operations can include operating the transceiver electronics to transmit a signal indicative of different portions of an identification sequence over different periods of time to a wireless device; operating the transceiver electronics to receive a hand-in request for a call associated with the wireless device, the hand-in request being generated in response to the transmitted signal; and operating the transceiver electronics to provide wireless service for the call in response to the hand-in request.

These and other implementations can include one or more of the following features. Operating the transceiver electronics to transmit the signal can include operating the transceiver electronics to transmit two or more Pseudorandom Noise (PN) sequences in two or more different transmission frames. The identification sequence can include the two or more Pseudorandom Noise (PN) sequences. Operating the transceiver electronics to transmit the signal can include operating the transceiver electronics to transmit the signal responsive to two or more Walsh codes modulated on a Pseudorandom Noise (PN) sequence. The identification sequence can include the two or more Walsh codes. The operations can include receiving a message that requests a transmission of the identification sequence. Operating the transceiver electronics to transmit the signal can include operating the transceiver electronics to transmit the signal in accordance with the received message.

In some implementations, a base station can include means for providing wireless service to wireless devices in the coverage area; means for transacting a call with a wireless device; means for receiving information indicative of a detected pilot code from the wireless device; means for receiving information indicative of a detected identification sequence from the wireless device, the detected identification sequence being associated with the detected pilot code, where the wireless device detects different portions of the detected identification sequence over different periods of time; means for using the information indicative of the detected identification sequence to identify one of the two or more FAPs; and means for performing a hand-off of the call to the identified FAP to continue to provide wireless service for the call via the identified FAP.

In yet another aspect, apparatuses and systems for wireless communications can include means for communicating with wireless devices in a coverage area; means for transacting a call with a wireless device; means for receiving information indicative of a pilot code detected by the wireless device, the pilot code being shared by multiple Femto Access Points (FAPs) that each provide wireless service in at least a portion of the coverage area; means for receiving information indicative of an identification sequence detected by the wireless device that is associated with the pilot code, wherein the wireless device detects different portions of the identification sequence over different periods of time; means for identifying one of the FAPs that share the pilot code, the means for identifying one of the FAPs being responsive to the information indicative of the identification sequence; and means for performing a hand-off of the call to the identified FAP to continue to provide wireless service for the call via the identified FAP.

Particular implementations of the subject matter described in this document can be implemented to realize one or more of the following potential advantages. Technologies described herein can enhance the user experience when transferring a call to a femto cell. Technologies described herein can reduce or eliminate dropped calls for femto cell hand-ins. Some wireless communication systems can use identification sequences for femto cell selection and re-selection.

The details of one or more implementations are set forth in the accompanying attachments, the drawings, and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1A:
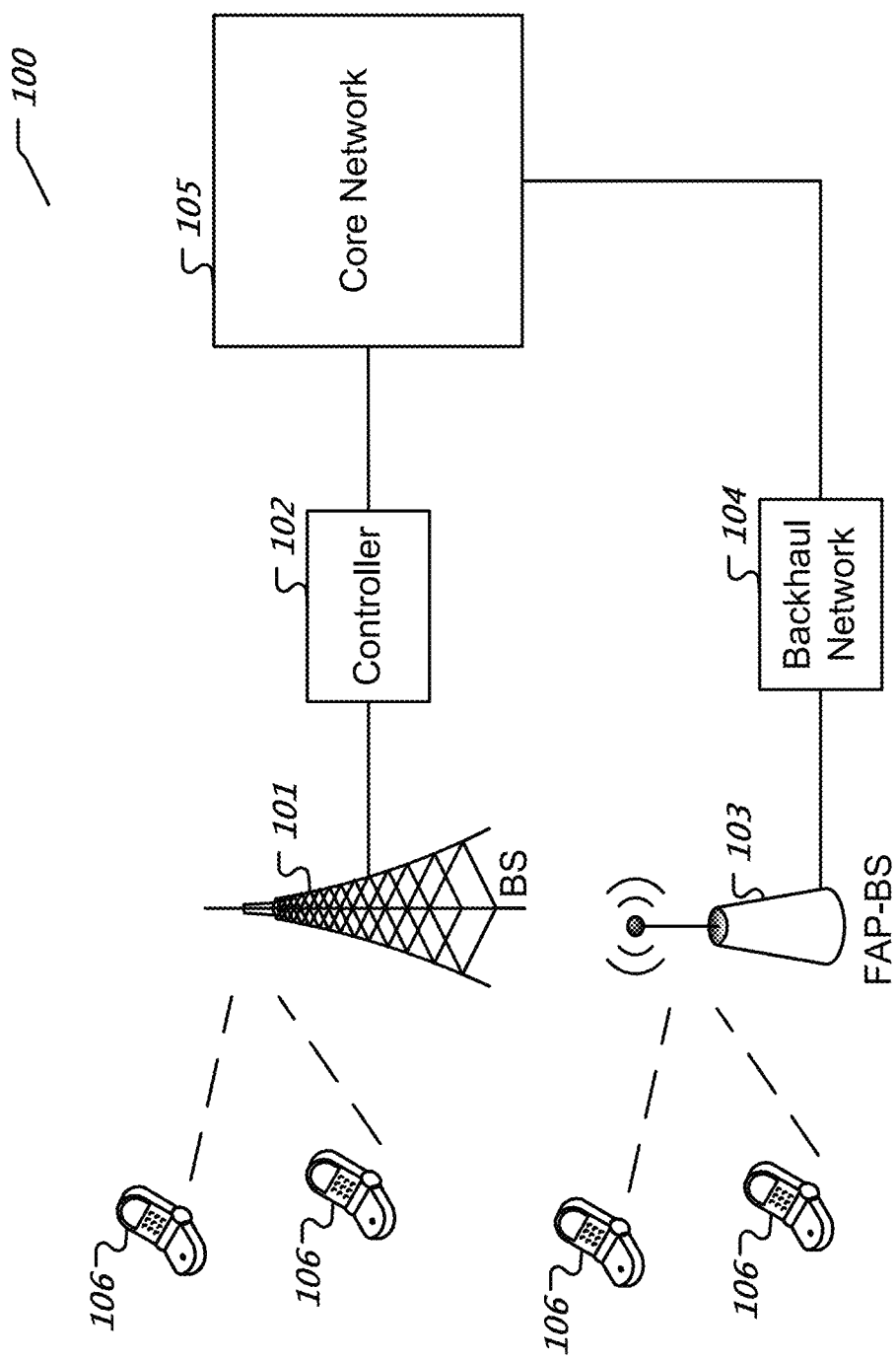
FIGS. 1A and 1B show different examples of a wireless communication system.

FIG. 1A shows an example of a wireless communication system. A wireless communication system 100 can include one or more base stations (BSs) 101, 103 and one or more wireless devices 106. Various examples of base stations include macro cell, micro cell, or pico cell base stations, and femto access points (FAP) such as femto cell base stations. A base station 101 can communicate with a controller 102, which can communicate with a core network 105. A core network 105 can include multiple different hardware elements which can be located in one or more physical structures. A FAP base station 103 can communicate with a core network 105 via backhaul network 104 such as a wired or wireless broadband network. A base station 101, 103 can transmit a signal on a forward link (FL), called a downlink signal, to one or more wireless devices 106. A wireless device 106 can transmit a signal on a reverse link (RL), called an uplink signal, to one or more base stations 101, 103. The wireless communication system 100 can be operated under one or more wireless protocols such as one based on 3GPP, 3GPP2, or IEEE 802.16/WiMAX standards.

A wireless operator can operate a macro cell and can permit individuals and businesses to operate femto cells within the macro cell. A wireless service subscriber can switch between using the macro cell and a femto cell. For example, an individual subscriber can own and operate a FAP to provide coverage in a home or office area, such a FAP can be referred as a home FAP or a home femto cell. In some implementations, a wireless operator can own and operate FAPs.

Figure 1B:
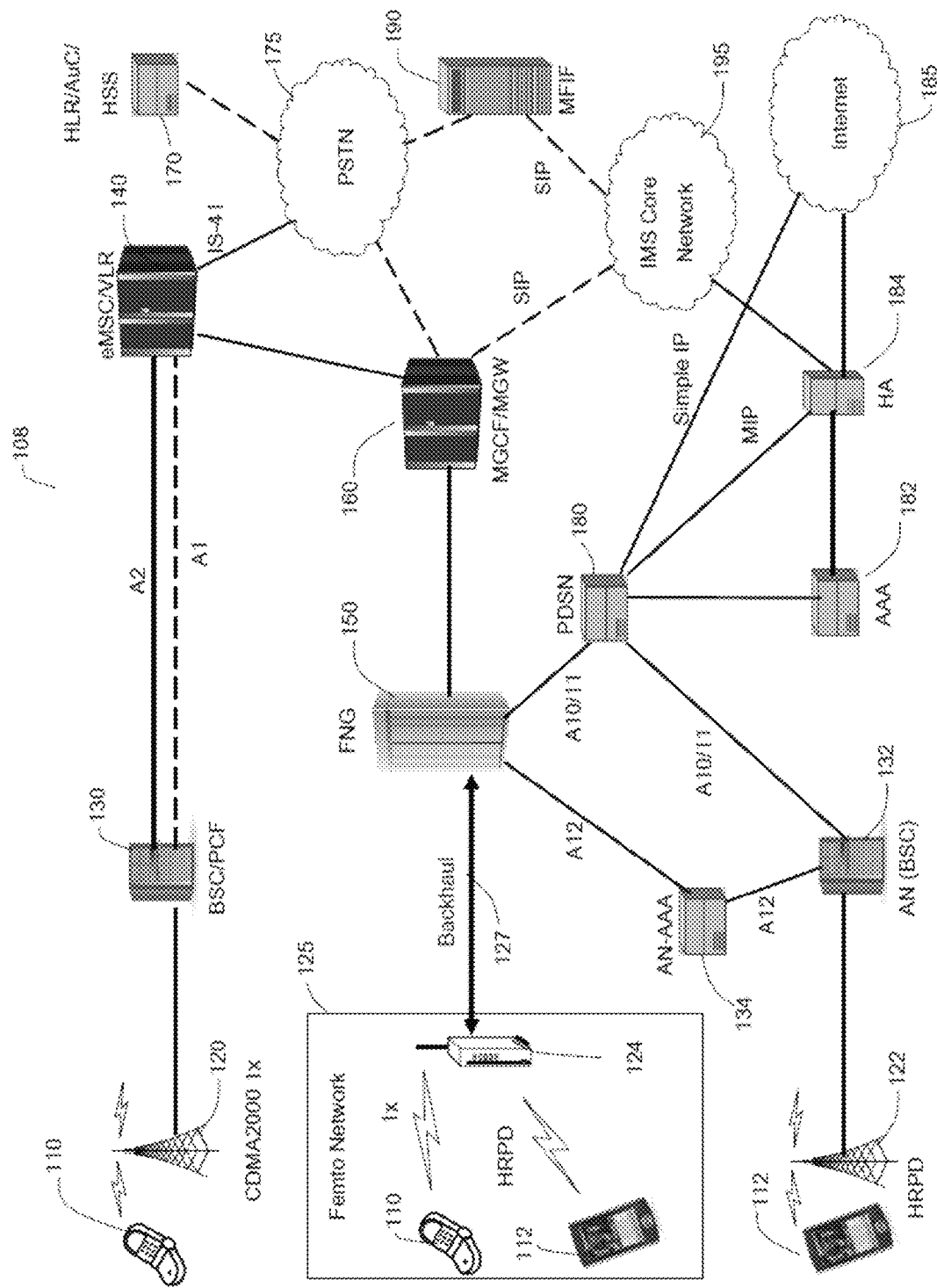

FIG. 1B shows a different example of a wireless communication system. A wireless communication system 108 can include one or more CDMA2000 1x circuit networks and one or more HRPD packet data networks to communicate with different wireless devices such as a mobile station 110 or an access terminal 112. In a CDMA2000 1x circuit network, a CDMA2000 1x mobile station 110 can connect to a macro cell through a CDMA2000 1x macro base station 120, which connects with a Base Station Controller (BSC)/Packet Control Function (PCF) 130, which connects with a Mobile Switching Center (MSC) or MSC emulator (eMSC) 140. The eMSC 140 can communicate with a home location register (HLR) 170 through a public switched telephone network (PSTN) 175. In a HRPD network, a HRPD AT 112 can connect with a HRPD macro cell through a HRPD Base Station 122, and a Access Network (AN)/Base Station Controller 132. Packet Data Serving Node (PDSN) 180 and Home Agent (HA) 184 can provide Internet Protocol (IP) connections such as simple and mobile IP connections to wireless devices such as ATs 120. PDSN 180 and HA 184 can communicate with a network such as the Internet 185.

When a wireless device such as a MS 110 or AT 112 enters a home or office femto network area 125, a wireless device can connect with the femto network in area 125 through FAP 124. A FAP 124 can communicate with a Femto Network Gateway (FNG) 150 via a backhaul network 127 such as a wired or wireless broadband connection. A FAP 124 can provide an air link connection using wireless technologies such as those established by the 3GPP or 3GPP2 standard groups. FNG 150 can include a Security Gateway. In some implementations, FNG 150 can perform FAP secure tunnel management procedures such as tunnel establishment and release, allocation of an IP address to a FAP from a serving CDMA2000 network, and encapsulation and de-capsulation of traffic to and from a FAP. FNG 150 can provide policy based management of voice and data traffic control and aggregation to a CDMA2000 core network and call manager. A FAP 124 can access subscription information from databases operated by servers such as HLR 170, authentication, authorization and accounting (AAA) server 182, and AN-AAA 134. The wireless communication system 108 can include a Media Gateway Control Function (MGCF)/Media Gateway (MGW) 160, an interworking function such as a MFIF 190, and an IP Multimedia Subsystem (IMS) core network 195.

Figure 1C:
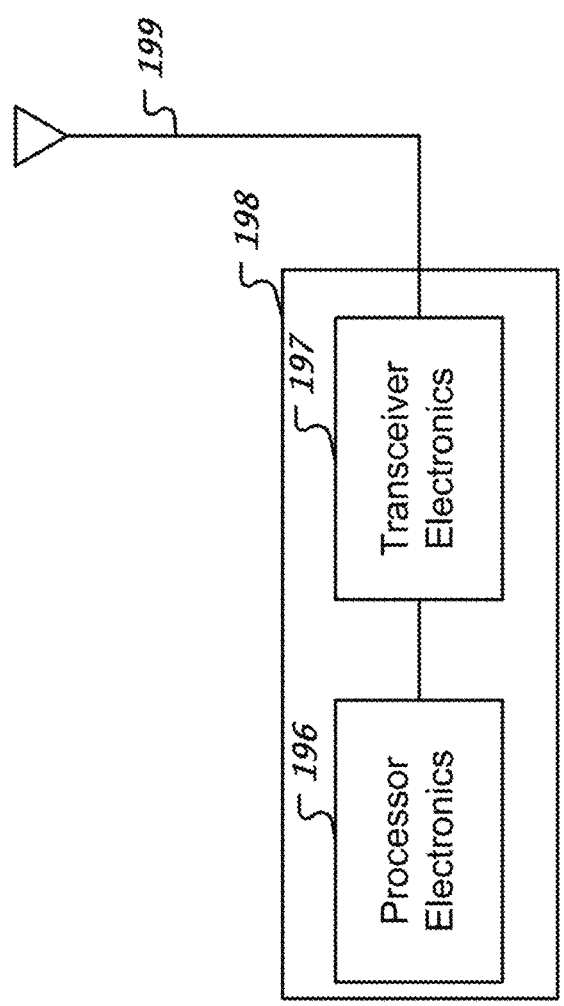
FIG. 1C shows an example of a radio station architecture.

FIG. 1C shows an example of a radio station architecture. A radio station 198 such as a base station or a wireless device can include processor electronics 196. Processor electronics 196 can include one or more processors that implements methods such as one or more of the techniques presented in this document. A radio station 198 can include transceiver electronics 197 to send and/or receive wireless signals over one or more communication interfaces such as an antenna 199. A radio station 198 can include other communication interfaces for transmitting and receiving data. In some implementations, processor electronics 196 can include at least a portion of transceiver electronics 197. A radio station 198 can include one or more memories configured to store information such as data and/or instructions.

Each base station in a wireless communication system can use a pilot code in a transmission to one or more wireless devices. Base-band firmware of wireless devices can search for one or more pilot codes and lock to the radio transmission associated with a particular cell or sector. A base station can use a pilot code such as a pseudorandom noise (PN) code to identify and distinguish itself from other neighboring cells or sectors. In some implementations, a 9-bit PN code called a pilot PN code, such as defined in the 3GPP2 standards, can distinguish individual base stations in a wireless network. For example, each base station can transmit a pilot PN sequence with its assigned PN code or offset.

When a wireless device is in the process of detecting a wireless network, the wireless device's base band firmware can search for pilot PN signals transmitted by the neighboring base stations. The wireless device can select a base station based on one or more criteria. For example, an wireless device can select the base station with the strongest pilot signal. The wireless device can lock on to the pilot signal from the selected base station and then decode signaling messages from that base station.

Some wireless communication systems can use a PN code length of 9-bits to provide 512 different PN sequences. A wireless communication system can operate different base stations that share the same pilot PN code. In some wireless deployments, base station pilot PN code assignment is performed through careful radio network PN planning. Before a base station starts transmitting over the air, a wireless operator can assign a pilot PN code to each base station to avoid duplicate pilot code assignments in overlapping wireless coverage areas. Base stations in non-overlapping wireless coverage areas can use the same PN code.

Femto cell deployment scenarios can share PN codes. However, femto cell deployments may have different deployment issues from macro, micro, or pico cell deployments. For dense deployment of femto cells, a macro cell coverage area can overlap with multiple femto cell coverage areas. In cases where the number of femto cells in the coverage area of a macro cell is beyond the maximum number of available PN codes for femto cells, a wireless operator can assign the same PN code to two or more FAPs in the coverage area of the macro cell. This duplicative PN code assignment to different FAPs within a macro, micro, or pico coverage area can make it difficult for a wireless communication system to ascertain the appropriate FAP for femto cell call hand-in, because such duplicative assignment can create PN code ambiguity.

Figure 2:
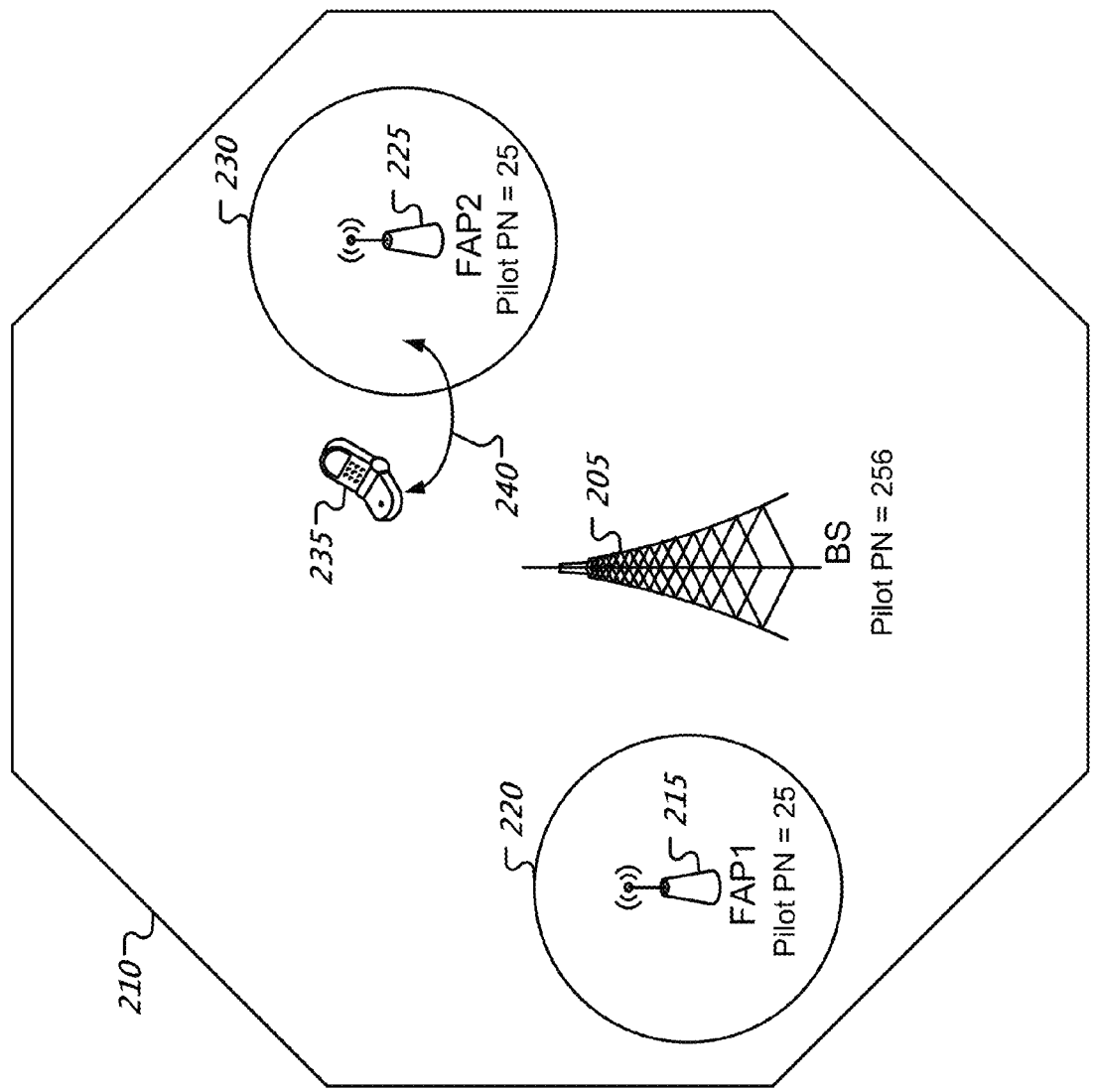
FIG. 2 shows an example of PN code ambiguity in a wireless communication system.

FIG. 2 shows an example of PN code ambiguity in a wireless communication system. A wireless communication system can include a BS 205 that provides wireless coverage in a macro cell 210. The BS 205 can, for example, broadcast a signal using a pilot PN code of 256. The wireless communication system can communicate with multiple FAPs that provide coverage of their own within the macro cell 210. Various examples of such FAPs include FAP1 215 and FAP2 225. FAP1 215 provides wireless coverage in a femto cell 220, e.g., cell-1, and can, for example, use a pilot PN code of 25 to broadcast a signal. Similarly, FAP2 225 provides wireless coverage in a different femto cell 230, e.g., cell-2, and can, for example, use a pilot PN code of 25 to broadcast a signal. In some implementations, different FAPs such as FAP1 215 and FAP2 225 are subscribed and registered with the wireless communication system's core network which is in communication with BS 205.

A wireless device 235 can be associated with a home FAP and a home femto cell, e.g., FAP2 235 and femto cell 230. The wireless device 235 can communicate with the BS 205 in an active session such as a voice call or a data call and can change locations. The wireless device 235 can search for stronger and better signals. When the wireless device 235 detects a signal from a different base station or detects a change, the wireless device 235 can report a pilot strength measurement to the BS 205. A pilot strength measurement report can include one or more pilot PN codes. For example, the wireless device 235 can move (240) into a coverage area of FAP2 225 and can detect a signal from FAP2 225 which can be indicative of pilot PN code 25. The wireless device 235 can report the pilot strength measurement of pilot PN code 25 to the BS 205. However, there are multiple FAPs 215, 225 that share the same pilot PN code of 25 within the cell 210 of the BS 205, and, accordingly, the BS 205 may have difficulty determining the specific FAP that the wireless device 235 reported. The BS 205 is required to identify the appropriate FAP for a call hand-in, otherwise, handing in a call to a different FAP may result in the call being dropped.

The technologies described herein can resolve the ambiguity created when base stations such as FAPs share a pilot code within a larger coverage area of a different BS. The technologies can include operating a FAP to transmit an identification sequence such as a special pilot sequence or Walsh code hopping sequence so that a wireless device or a different system component can determine the identity of a specific FAP. In some implementations, a FAP can use one or more pilot PN codes and multiple transmission time slots to encode and transmit an identification sequence associated with the FAP.

Figure 3:
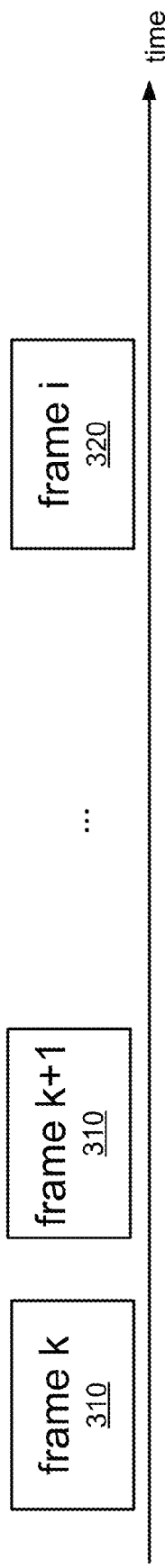
FIGS. 3A, 3B, and 3C show different aspects of an example of transmitting a special pilot.

FIGS. 3A, 3B, and 3C show different aspects of an example of transmitting a special pilot. FIG. 3A shows an example of a transmission sequence of multiple HRPD physical (PHY) frames such as regular data frames 310 or special pilot frames 320. A FAP can alternate between transmitting regular data frames 310 and special pilot frames 320 in the time domain.

FIG. 3B shows an example of a HRPD based regular data frame. A regular data frame 310 can include two regular pilot slots 335 being each 96 chips long, four medium access control (MAC) slots 330 being each 64 chips long, and four data slots 225 being each 400 chips long.

FIG. 3C shows an example of a HRPD based special pilot frame. A special pilot frame 320 can include two regular pilot slots 335 being each 96 chips long, and four MAC slots 330 being each 64 chips long. The special pilot frame 320 can include one or more special plot slots 350. In some implementations, an identification sequence is encoded in one or more special plot slots 350.

In some implementations, a special pilot frame 320 can include a first 1,024 chip portion and a second 1,024 chip portion which each portion including one regular pilot slot 335, two MAC slots 330, and two special plot slots 350. In some implementations, a special pilot frame 320 can be a regular data frame with data slots including the special pilot slots.

Different FAPs can share a pilot PN code for transmitting in a regular pilot slot 335. To distinguish such FAPs, a FAP can use different pilot codes for transmitting in different special plot slots 350. In some implementations, a FAP can use a pre-defined transmission algorithm to determine a specific code for transmission of a special pilot in a specific time slot. In some implementations, a FAP can determine the content for a special pilot slot 350 based on a network controlled transmission mechanism. For example, a FAP can receive information that specifies the special pilot content and corresponding time slots from an AN.

A special pilot sequence generation algorithm can generate the transmission time, e.g., frame numbers, and pilot PN codes for a special pilot sequence. A FAP can transmit a special pilot sequence signal based on the output from such an algorithm. The output can include a sequence of PN codes and corresponding frame numbers. In some implementations, a FAP can transmit a special pilot sequence autonomously. In some implementations, a system component such as an AN can trigger a FAP to transmit a special pilot sequence. A wireless device can use such an algorithm to detect a special pilot PN sequence.

Input to a special pilot sequence generation algorithm can include a regular pilot PN code of a FAP, a sector ID of the FAP, and system timing information. The system timing information can be in units of a frame index. A wireless device can use one or more techniques to retrieve a pilot PN code. For example, a wireless device can process a neighbor list message broadcast to obtain one or more pilot PN codes. In another example, a wireless device can access a data structure such as a Preferred Roaming List (PRL) and Preferred User Zone List (PUZL) to obtain one or more pilot PN codes. In some implementations, a wireless device can store a sector ID of the device's home femto cell in a PRL or a PUZL.

A special pilot sequence generation algorithm can generate special pilot PN codes and transmissions frame indices based on a regular pilot PN code of a FAP, a sector ID of the FAP, and system timing information. The algorithm can use a mapping function M to generate a special pilot PN code $C_{i,k}=M(i, S_k, P_k)$ where k is the k-th FAP, i is the i-th PHY frame index, $C_{i,k}$ is a special pilot PN code for the i-th frame for the k-th FAP, S is a SectorID of FAP k, and P is a regular pilot PN code associated with FAP k. For a given transmission time specified by a PHY frame index, a random number X can be generated from a randomizer f $X_{i,k}=f(i, S_k, P_k)$ where i is a PHY frame index, S is a SectorID of FAP k, and P is a regular pilot PN code associated with FAP k. Parameters such as Offset and WalshCoverCode can be derived from a regular pilot PN code and a SectorID. In some implementations, a special pilot sequence $C_{i,k}$ can be transmitted by FAP k, using the WalshCoverCode, at frame number (X-Offset) Mod N, where N is a special pilot transmission cycle.

An AT can monitor for an identification sequence such as a special pilot PN sequence. In some implementations, the AT can monitor over different frame indices generated by a special pilot sequence generation algorithm. After detection, a AT can autonomously report to an AN the special pilot sequence detection result in a message such as an Additional Pilot Information Notification Message (APINM). In some implementations, an APINM can include the following field types.

| Field | Length (bits) |
|---|---|
| MESSAGE_SEQUENCE | 8 |
| NUM_ADDL_PI_INFO_REC | 8 |
| NUM_ADDL_PI_INFO_REC occurrences | |
| { | |
| PILOT_PN | 9 |
| SPECIAL_PILOT_INCLUDED | 1 |
| FRAME_INDEX | 16 (if present) |
| SPECIAL_PILOT_PN | 9 (if present) |
| SECTOR_ID_INCLUDED | 1 |
| SECTOR_ID | 24 (if present) |
| RESERVED | |
| } | |

The PILOT_PN field is for a pilot PN code of a FAP. If the SPECIAL_PILOT_INCLUDED field is set to "1", the FRAME_INDEX and SPECIAL_PILOT_PN fields are included in this message. The FRAME_INDEX field can include a PHY frame number at which an AT has detect at least a portion of a special pilot sequence transmission. The SPECIAL_PILOT_PN field is the PN code detected by an AT in the FRAME_INDEX frame. The field of SECTOR_ID is used for an AT to report a SectorID of a detected FAP. If an AT can calculate the SectorID from a detected special pilot sequence, the AT can include the 24 least significant bits (LSB) of a SectorID in the SECTOR_ID field. A macro AN can use the SECTOR_ID field to perform a hand-in.

An AT can detect one or more transmissions of a special pilot sequence from one or more FAPs during a time period. The AT can include one or more detection results in an APINM or can report the results separately.

A macro AN can request an AT to report a detection of a special pilot sequence using an Additional Pilot Request Message (APIRM). In some implementations, an APIRM can include the following field types.

| Field | Length (bits) |
|---|---|
| MESSAGE_SEQUENCE | 8 |
| NUM_PILOT_PN | 8 |
| NUM_PILOT_PN occurrences | |
| { | |
| PILOT_PN | 9 |
| SPECIAL_PILOT_INCLUDED | 1 |
| FRAME_INDEX | 16 (if present) |
| SPECIAL_PILOT_PN | 9 (if present) |
| } | |
| RESERVED | |

The PILOT_PN field is for a pilot PN code of a FAP. If SPECIAL_PILOT_INCLUDED is set to "1", the FRAME_INDEX and SPECIAL_PILOT_PN fields are included in this message. The macro AN can use fields such as PILOT_PN, FRAME_INDEX, and SPECIAL_PILOT_PN to identify a special pilot sequence transmission. If the macro AN does not include the FRAME_INDEX and SPECIAL_PILOT_PN fields, an AT can use a special pilot sequence generation algorithm to determine a special pilot sequence. An APIRM can trigger an AT to make a detection. For example, an AT can monitor for a transmission of a special pilot sequence indicated by an APIRM. Once the AT detects a special pilot sequence transmission, the AT can report the detection result in an APINM.

A macro AN can determine a SectorID of a FAP from reported frame indices or special pilot PN codes an APINM. In some implementations, an AT can calculate a FAP SectorID, perform a detection, and can report the detection result to the macro AN in an APINM.

Let $C_{i,k} = f(i, S_k, P_k)$ be a randomizer formula for femto-cell k. Then the sequential results $\langle C_{0,k}, C_{1,k}, L, C_{N-1,k} \rangle$ can be used by a macro AN to determine a FAP SectorID. In some implementations, the design criteria for function f is: for any $j \neq k$, there exists an integer $N \leq N_0$ such that, if $S_j \neq S_k$ or $P_j \neq P_k$, then $\langle C_{0,j}, C_{1,j}, L, C_{N-1,j} \rangle \neq \langle C_{0,k}, C_{1,k}, L, C_{N-1,k} \rangle$. Let $M_C$, $M_S$, and $M_P$ denote the number of effective bits for C, S, and P respectively. Using a condition where $2^{N \cdot M_C} \geq 2^{M_S + M_P}$, or $N \cdot M_C \geq M_S + M_P$, can avoid duplicated special pilot PN sequences. In some implementations, $S_k$ and $P_k$ can be combined into one $(M_S + M_P)$-bit variable. In some implementations, the optimization of binary-tuple function such as $C_{i,k} = f(i, SP_k)$ can achieve a minimum N for parameters $M_C$, $M_S$, and $M_P$.

A macro AN can determine a FAP SectorID from reported frame sequences. Let $X_{i,k} = f(i, S_k, P_k)$ be a randomizer formula for femto-cell k. Then the sequential results $\langle X_{0,k}, X_{1,k}, \ldots, X_{N-1,k} \rangle$ can be used by a macro AN to determine a FAP SectorID. In some implementations, the design criteria of function f is: for any $j \neq k$, there exists an integer $N \leq N_0$ such that, if $S_j \neq S_k$ or $P_j \neq P_k$, then $\langle X_{0,j}, X_{1,j}, \ldots, X_{N-1,j} \rangle \neq \langle X_{0,k}, X_{1,k}, \ldots, X_{N-1,k} \rangle$. Let $M_X$, $M_S$, and $M_P$ denote the number of effective bits for X, S, and P respectively. Using a condition where $2^{N \cdot M_X} \geq 2^{M_S + M_P}$, or $N \cdot M_X \geq M_S + M_P$, can avoid duplicated special pilot PN sequences. In some implementations, $S_k$ and $P_k$ can be combined into one $(M_S + M_P)$-bit variable. In some implementations, the optimization of binary-tuple function $X_{i,k} = f(i, SP_k)$ can achieve a minimum N for parameters $M_X$, $M_S$, and $M_P$.

Figure 4:
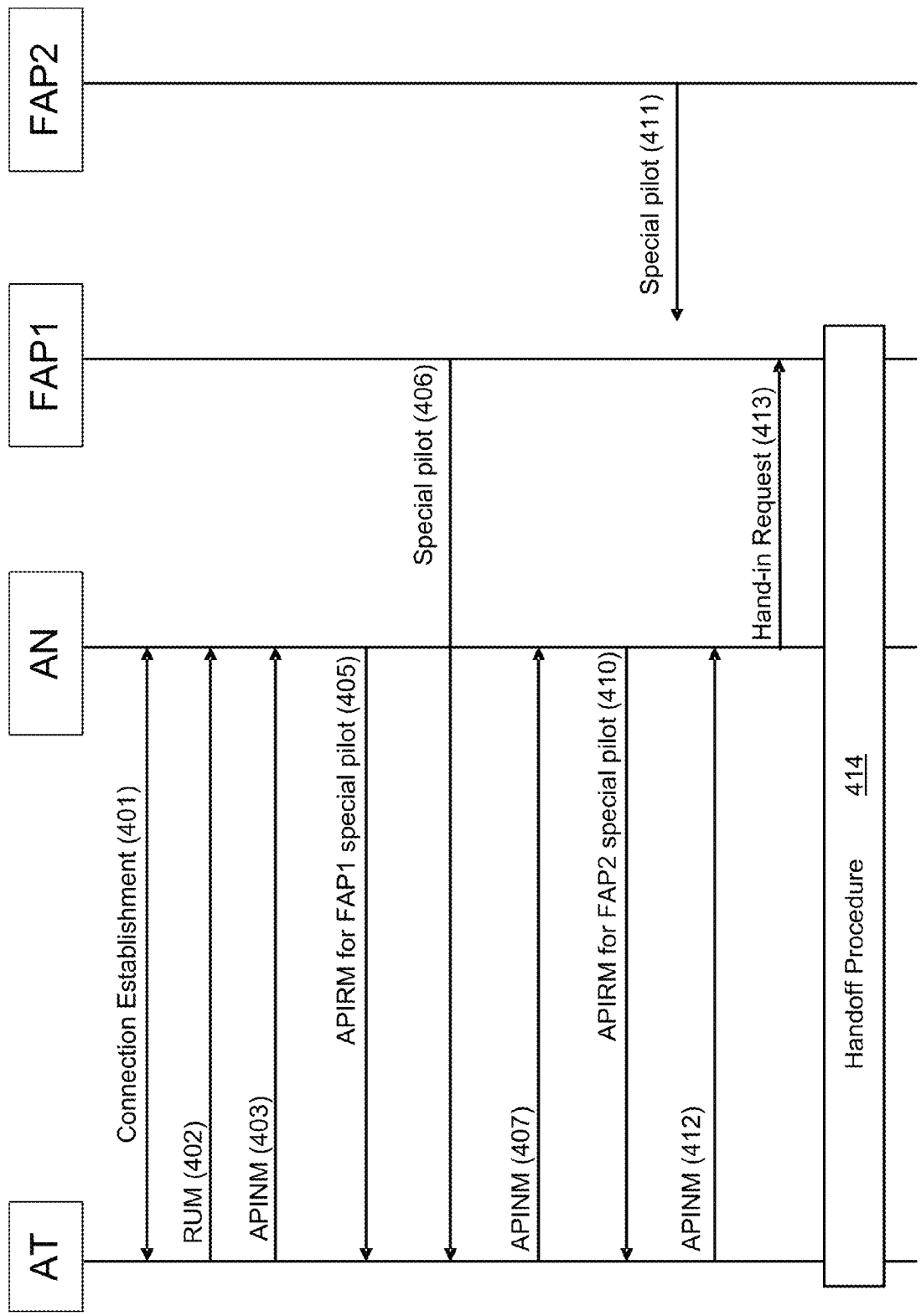
FIG. 4 shows an example of a timeline that includes a detection of a special pilot transmission from a FAP and a call hand-off to the detected FAP.

FIG. 4 shows an example of a timeline that includes the detection of a special pilot transmission from a FAP and a call hand-off to the detected FAP. The timeline includes a message flow between participants in a wireless communication system. The participants in this example include an AT, an AN, FAP1, and FAP2. FAP1 and FAP2 can be configured to autonomously transmit a special pilot.

An AT can establish a connection with a macro AN (401). The AT can detect and measure a regular pilot signal of FAP1 and can report the measurement result in a Route Update Message (RUM) to the macro AN (402). FAP1 can transmit a special pilot signal. If the AT can detect a special pilot PN sequence signal of FAP1, the AT can report the special pilot PN sequence to the macro AN in an APINM (403).

The macro AN can receive the RUM from the AT. The macro AN can determine whether the pilot PN code indicated by the RUM is shared by multiple FAPs. If the macro AN receives an APINM from the AT, the macro AN can process the special pilot PN sequence in the APINM to determine a specific FAP for a call handoff. If the macro AN does not receive an APINM, the macro AN can send an Additional Pilot Request Message (APIRM) to the AT to request the AT to report special pilot PN sequences from a FAP such as FAP1 (405). The macro AN can start a timer for receiving a detection report from the AT. FAP1 can transmit a special pilot signal during a special pilot transmission period (406). The AT can detect a special pilot PN sequence for the period based on a special pilot PN sequence generation algorithm. After measuring a signal that includes a special pilot PN sequence, the AT can report the detection result of FAP1 to the macro AN in an APINM (407). The APINM can include special pilot PN sequence information and associated frame index information.

The macro AN can send an APIRM to request the AT to report the special pilot PN sequences from FAP2 (410). The macro AN can start a timer for receiving a detection report from the AT. FAP2 can transmit a special pilot signal during a different special pilot transmission period (411). However, the AT may not receive or process a signal from FAP2 because the signal from FAP2 may be too attenuated upon arrival at the AT. Nonetheless, the AT can monitor for a signal from FAP2. Based on a timeout period or if the AT detected a signal from FAP2, the AT can report the FAP2 detection result to the macro AN in an APINM (412). The APINM can include information indicative of a special pilot PN sequence information and associated frame index information. The macro AN can determine a SectorID from the report of detected special pilot PN sequence(s) and detected frame index sequence(s), and can identify a target FAP for the AT. The macro AN can send a hand-in request to the identified FAP to trigger a hand off process (413). The marco AN, AT, and FAP1 can follow a handoff procedure (414) such as a HRPD handoff procedure.

In some implementations, the macro AN can coordinate between FAPs and AT to transmit and receive special pilot PN sequences for the identification of the target FAP so that the marco AN can hand-off the AT to the target FAP. Such coordination can reduce interference within a macro AN cell area. Coordination between the AN and the FAPs can include using a Femto Group (FG). In some implementations, a FG can include the identities of the FAPs that use the same pilot PN code in the coverage area of an associated macro AN. When the macro AN processes a RUM from an AT, the macro AN can check an associated FG to determine whether the FG contains more than one FAP. If the FG contains more than one FAP, the macro AN can use an identification sequence to identify a target FAP for a hand-in.

Figure 5:
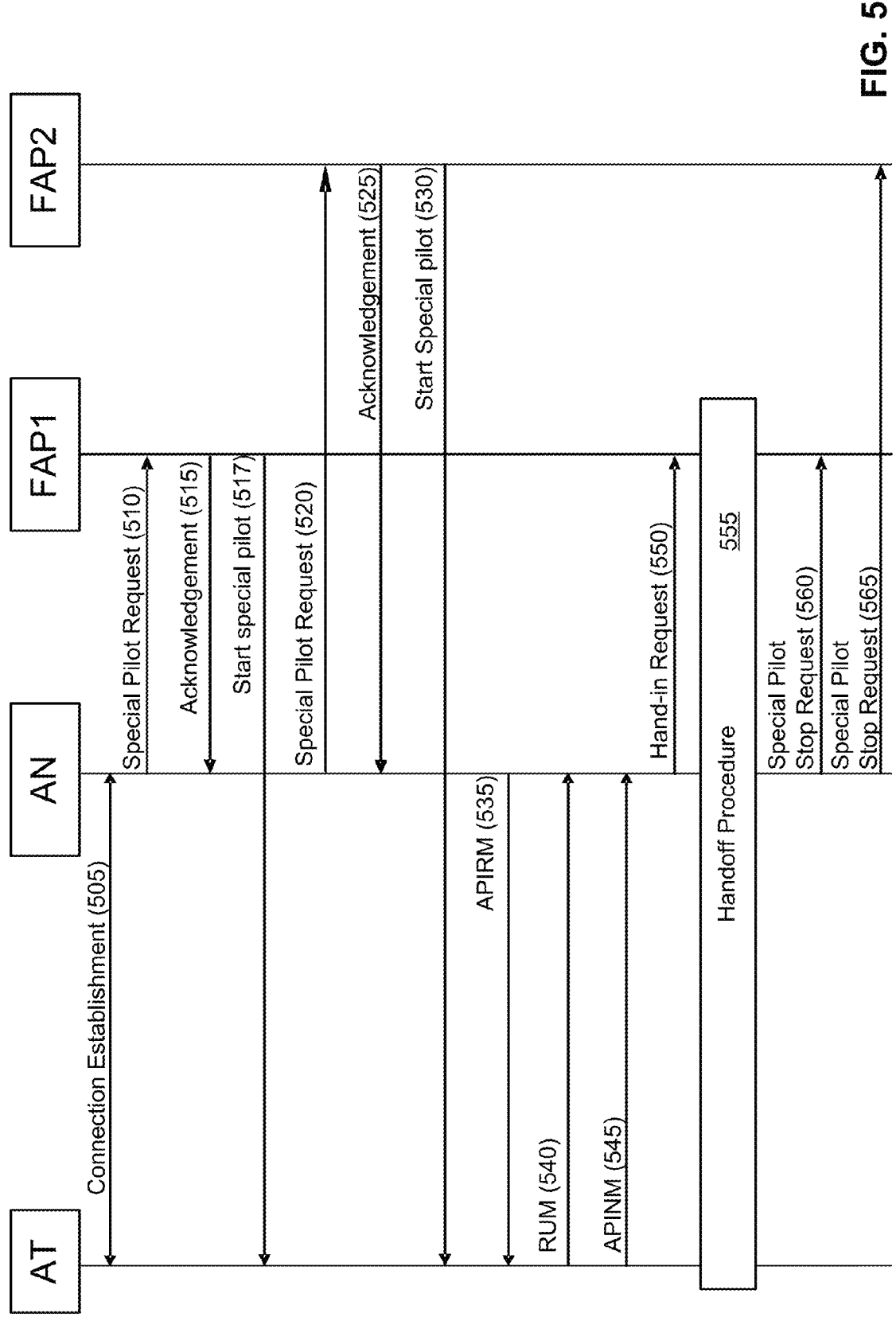
FIG. 5 shows a different example of a timeline that includes a detection of a special pilot transmission from a FAP and a call hand-off to the detected FAP.

FIG. 5 shows a different example of a timeline that includes a detection of a special pilot transmission from a FAP and a call hand-off to the detected FAP. The timeline includes a message flow between participants in a wireless communication system. The participants in this example include an AT, an AN, FAP1, and FAP2. FAP1 and FAP2 can be configured to transmit a special pilot sequence upon request.

An AT can establish a connection with a macro AN (505). The AT, in an active call state, can enter an area such as a home FAP area covered by the macro AN. In some implementations, a macro AN can access a FG data structure to determine how many FAPs are in the FG. If there are multiple FAPs in the FG, the macro AN can trigger special pilot transmissions to resolve a target FAP for a hand-in.

The macro AN can send a special pilot request message to FAP1 over a backhaul interface to request that FAP1 start a special pilot transmission (510). In some implementations, the macro AN can specify a special pilot PN code. FAP1 can send an acknowledgement indicative of an agreement to transmit a special pilot as requested (515). FAP1 can transmit a special pilot signal (517). In some implementations, FAP1 can use a timer to generate and transmit the special pilot transmission for a period of time. When the timer expires, FAP1 can stop the special pilot transmission.

The macro AN can send requests messages to additional FAPs in a FG over one or more backhaul interfaces to trigger special pilot sequence transmissions. For example, the macro AN can send a special pilot request message to FAP2 over a backhaul interface to request that FAP2 start a special pilot transmission (520). FAP2 can send an acknowledgement indicative of an agreement to transmit a special pilot as requested (525). The FAP2 can transmit a special pilot signal (530). In some implementations, FAP2 can use a timer to generate and transmit the special pilot transmission for a period of time. When the timer expires, FAP2 can stop the special pilot transmission.

The macro AN can send an APIRM message to instruct the AT to detect a special pilot PN sequence (535). The AT can send a RUM to the macro AN (540). The AT can measure and can report a special pilot sequence to the macro AN in an APINM (545). If the APINM sent by the AT indicates that FAP1 is the target FAP for hand-in, the macro AN can send a hand-in request to FAP1 (550). The macro AN, FAP1, and AT can use a handoff procedure to hand a call from the macro AN to FAP1 (555). The macro AN can send a special pilot stop request to FAP1 (560). The macro AN can send a special pilot stop request to additional FAPs in the FG such as FAP2 (565). In some implementations, a FAP can stop a special pilot transmission by itself when a special pilot transmission timer expires.

A FAP, in some implementations, can transmit a pilot signal on a dedicated pilot channel. For example, a CDMA2000 1x based FAP base station can transmit a pilot signal on the Walsh channel "0" constantly. A FAP can transmit a pilot signal, which can include a pilot code, for station identification. In some implementations, a FAP can generate a pilot signal by modulation of a sector short PN sequence based on a Walsh code.

Figure 6:
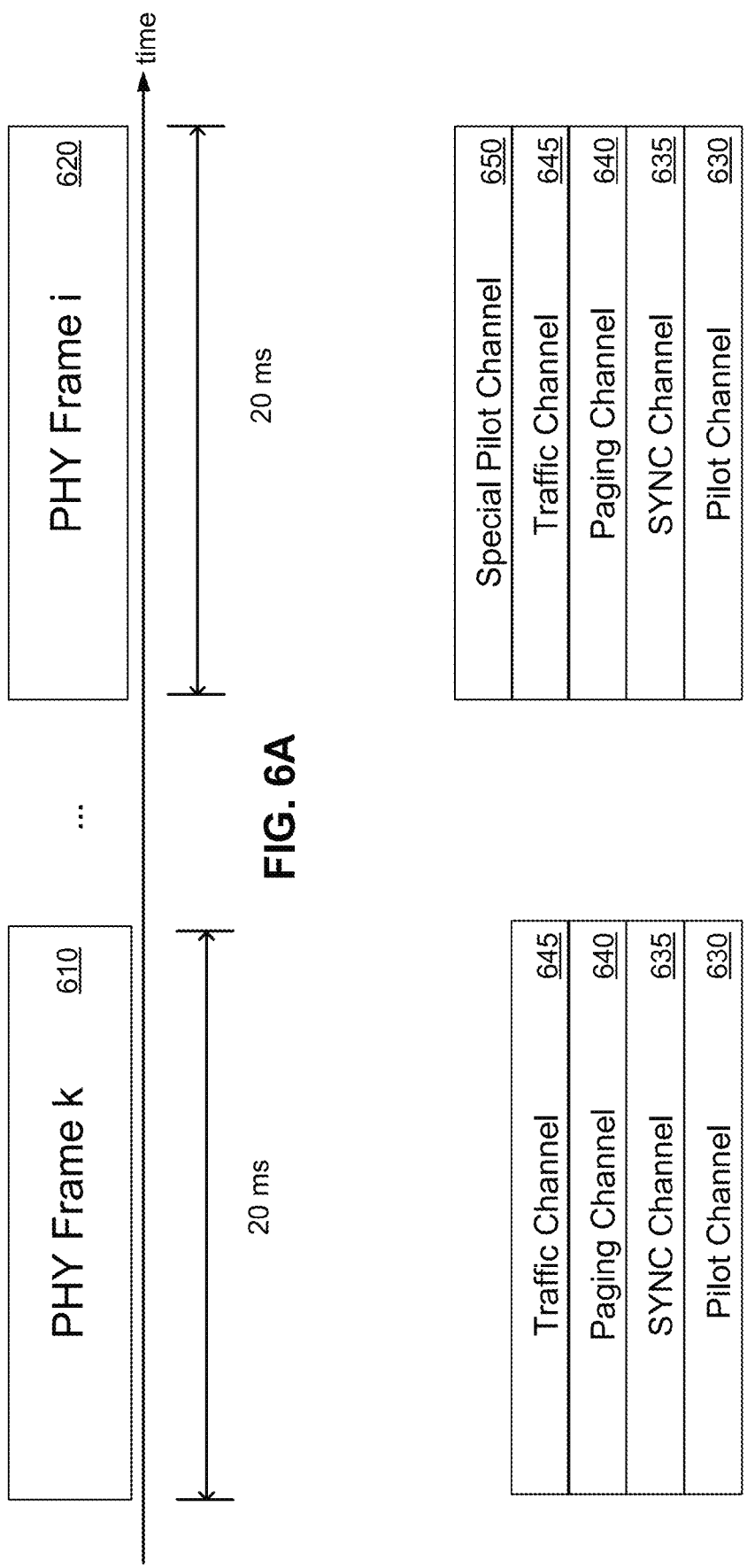
FIGS. 6A, 6B, and 6C show different aspects of an example of transmitting a special pilot over a channel.

FIGS. 6A, 6B, and 6C show different aspects of an example of transmitting a special pilot over a channel. FIG. 6A shows an example of a transmission sequence of multiple CDMA2000 1x PHY frames. A FAP can transmit multiple frames 610, 620. In some implementations, a FAP can transmit CDMA2000 1x PHY frames with each frame having a duration of 20 ms. The FAP can transmit one or more regular PHY frames 610 and one or more special pilot PHY frames 620.

FIG. 6B shows an example of a CDMA2000 1x based PHY frame. A regular PHY frame 610 can include information modulated on different channels. For example, a FAP can use different Walsh codes to modulate data for different channels in the regular PHY frame 610 such as a Pilot Channel 630, SYNC Channel 635, Paging Channel 640, and Traffic Channel 645.

FIG. 6C shows an example of a CDMA2000 1x based PHY frame that includes a special pilot channel. A special pilot PHY frame 620 can include information modulated on different channels. For example, the FAP can use different Walsh codes to modulate data for different channels in the special pilot PHY frame 620 such as a Pilot Channel 630, SYNC Channel 635, Paging Channel 640, Traffic Channel 645, and a special pilot channel 650. In some implementations, a FAP can use the zeroth Walsh code for the Pilot Channel 630 and can use one or more different Walsh codes for the special pilot channel 650 transmission over one or more periods of time. The special pilot channel 650 can be used to expand the pilot PN sequence for physical layer identification of a FAP. In some implementations, a format of an identification sequence format can specify a sequence of Walsh codes for special pilot channel modulation and the time period indices, e.g., frame indices, for using the Walsh codes included in an identification sequence. A wireless device can use a detected identification sequence to identify a FAP or can send information on the detected identification sequence to a BS, which can determine the identify of the FAP that transmitted the identification sequence.

Let $W_k$ be a set of Walsh codes for the generation of a special pilot corresponding to the k-th FAP. In some implementations, Walsh codes for distinguishing different channels such as Sync Channel, Paging Channel, Common Signaling Channel and Traffic Channels are not included in $W_k$. In some implementations, $W_k$ can include m Walsh codes: $W_k = \{c_0, c_1, \ldots c_{m-1}\}$. A special pilot signal can include a sequence of Walsh codes $B_k$ modulated on a pilot code such as a short PN sequence over different time periods. A Walsh code sequence $B_k$ is given by $B_k = \{s_0, s_1, \ldots s_j \ldots s_{n-1}\}$ where $s_j \in W_k$. This Walsh code sequence forms a Walsh code hopping pattern in the time domain. In some implementations, an identification sequence can include $B_k$ and can include corresponding time period indices. The length n of Walsh hopping sequence and special pilot Walsh code size m can be chosen based on the total number of femto cells to be deployed in an overlapped coverage area of a macro cell. The longer length, n, of a Walsh code hopping sequence and a larger Walsh code set size, m, for the special pilots can increase the number of reusable special pilot PN codes.

The following table shows an example of the special pilot PN space expansion from space $N_0$ of regular pilot PN codes reserved for femto cells.

|       | m = 2   | m = 4    | m = 8    | m = 16    | m = 32      | m = 64      |
|-------|---------|----------|----------|-----------|-------------|-------------|
| n = 1 | $2N_0$  | $4N_0$   | $8N_0$   | $16N_0$   | $32N_0$     | $64N_0$     |
| n = 2 | $4N_0$  | $16N_0$  | $64N_0$  | $256N_0$  | $1024N_0$   | $64^2 N_0$  |
| n = 3 | $8N_0$  | $64N_0$  | $512N_0$ | $16^3 N_0$| $32^3 N_0$  | $64^3 N_0$  |

For the n=1 case, which means there is no Walsh hopping, the femto cell pilot PN code space can be expanded by m times of regular usable PN codes for the femto cells.

A Walsh code hopping sequence can be generated by a randomization function G based on input known to both mobile stations and FAP. Let function G generate a randomized number L from 0 to m, where $L=G(i, R_k, P_k)$ and i is a frame index, $R_k$ is a cell ID of FAP k, and $P_k$ is a regular PN code of FAP k. Then the Walsh hopping sequence is $s_j=c_L$. A FAP can hop the special pilot sequence on each frame or every couple of frames based on whether mobile stations can successfully detect special pilot sequences hopped on every frame. A FAP can use a longer hopping period to increase the likelihood of detection at a mobile station.

A FAP can autonomously transmit a special pilot signal based on a Walsh code hopping sequence. A FAP can access a Walsh code hopping sequence in a configuration data structure. In some implementations, a FAP can access a Walsh hopping sequence from a femto configuration server and store the sequence in non-volatile memory such as flash. A wireless system operator can provision a Walsh code hopping sequence length, n, and Walsh code size, m, according to the total number of femto cells in the macro cell's coverage area. A FAP can start to transmit a Walsh hopping sequence after power-up and without receiving a request to do so in an autonomous operation mode.

A MS can detect and can autonomously report on a detected special pilot signal, e.g., a signal including a Walsh hopping sequence, in an Additional Pilot Information Notification Message (APINM). In some implementations, a CDMA2000 1x based APINM can include the following field types.

| Field | Length (bits) |
|---|---|
| MESSAGE_SEQUENCE | 8 |
| NUM_ADDL_PI_INFO_REC | 8 |
| NUM_ADDL_PI_INFO_REC occurrences | |
| { | |
| PILOT_PN | 9 |
| SPECIAL_PILOT_INCLUDED | 1 |
| FRAME_INDEX | 8 (if present) |
| SPECIAL_PILOT | 9 (if present) |
| CELL_ID_INCLUDED | 1 |
| CELL_ID | 24 (if present) |
| } | |
| RESERVED | |

The PILOT_PN field is a pilot PN code of a FAP. If the SPECIAL_PILOT_INCLUDED field is set to "1", the FRAME_INDEX and SPECIAL_PILOT fields are included in this message. The FRAME_INDEX field can include a PHY frame number in which a MS has detected a special pilot sequence. The SPECIAL_PILOT field can include the Walsh code detected by the MS in the FRAME_INDEX frame. The CELL_ID field is used for the MS to report a CellID of a detected FAP. If a MS can calculate a CellID based on a detected special pilot sequence, the MS can include the 24 LSBs of a CellID in the CELL_ID field.

A MS can detect one or more transmissions of a special pilot sequence from one or more FAPs during a time period. The MS can include one or more detection results in an APINM or can report the results separately.

A macro BS can request a MS to report a special pilot sequence by sending an APIRM to the MS. In some implementations, a CDMA2000 1x based APIRM can include the following field types.

| Field | Length (bits) |
|---|---|
| MESSAGE_SEQUENCE | 8 |
| NUM_PILOT_PN | 8 |
| NUM_PILOT_PN occurrences | |
| { | |
| PILOT_PN | 9 |
| SPECIAL_PILOT_INCLUDED | 1 |
| FRAME_IDEX | 16 (if present) |
| SPECIAL_PILOT | 9 (if present) |
| } | |
| RESERVED | |

The PILOT_PN field is a pilot PN code of a FAP. If the SPECIAL_PILOT_INCLUDED field is set to "1", the FRAME_INDEX and SPECIAL_PILOT fields are included in this message. The macro BS can set the SPECIAL_PILOT field to the Walsh code to be detected at the frame indicated by the FRAME_INDEX field.

If a MS receives an APIRM from a macro BS, the MS can acquire the additional information as requested by the APIRM, and then report the additional information, if available, to the BS in an APINM.

Figure 7:
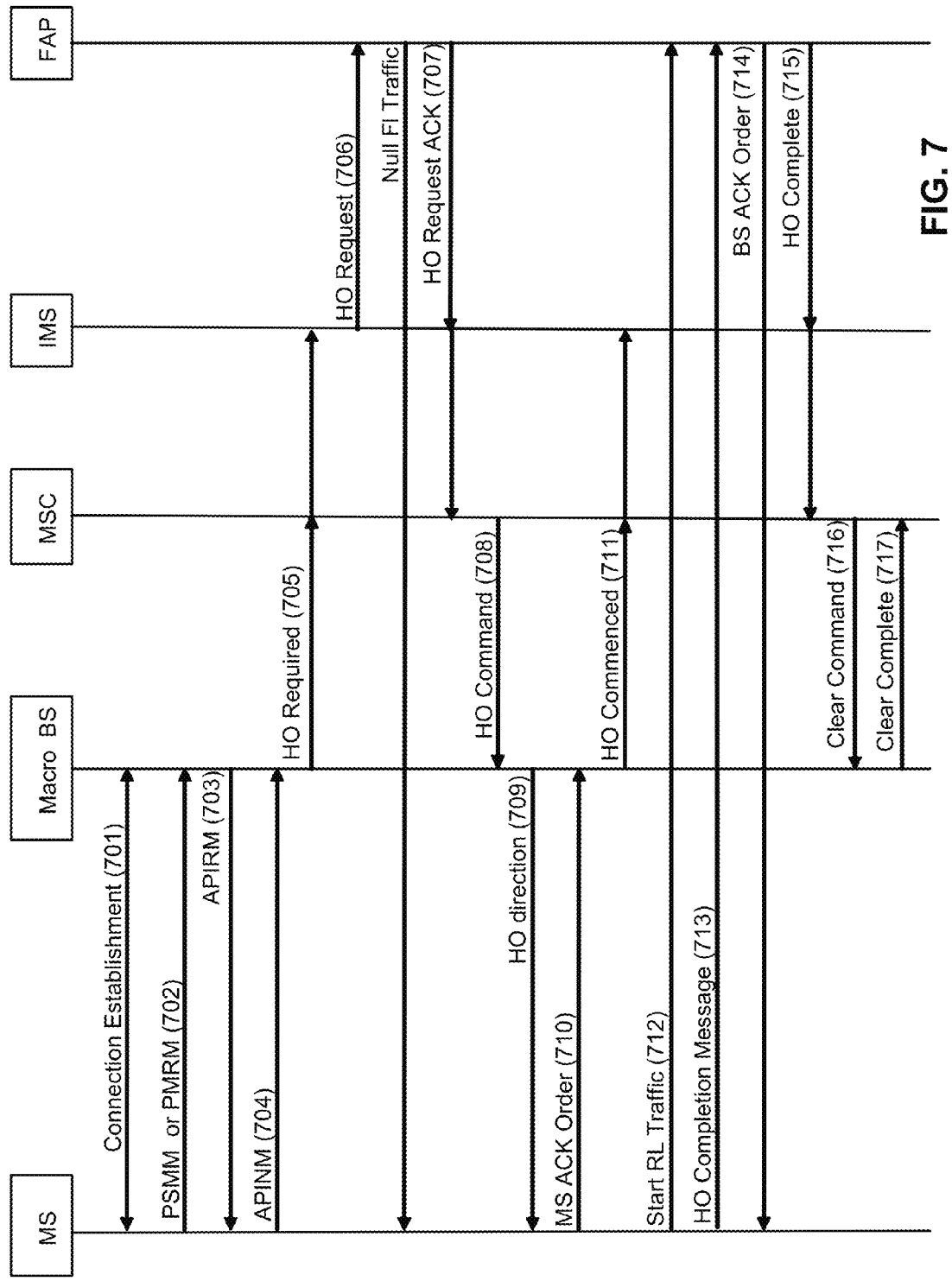
FIG. 7 shows a different example of a timeline that includes a detection of a special pilot transmission from a FAP and a call hand-off to the detected FAP.

FIG. 7 shows a different example of a timeline that includes a detection of a special pilot transmission from a FAP and a call hand-off to the detected FAP. The timeline includes a message flow between participants in a wireless communication system. The participants in this example include a MS, a macro BS, MSC, IMS, and a FAP for CDMA2000 1x communications. A FAP can be configured to autonomously transmit a special pilot.

In FIG. 7, a MS can connect with a macro BS and can enter a coverage area of a FAP, e.g., home femto cell area (701). The MS monitor for signals from different base stations and can send a Pilot Strength Measurement Message (PSMM) or a Power Measure Report Message (PMRM) to the macro BS (702). If the macro BS can determine the identify of the FAP from the PSMM or PMRM message, the macro BS can trigger a handoff procedure.

If the macro BS cannot determine the identify of the FAP from the PSMM or PMRM, then the macro BS can send a request such as an APIRM to the MS to request that the MS report additional pilot information (703). The APIRM can specify one or more special pilot sequences. Using information contained in the APIRM, the MS can monitor for at least one of the special pilot sequences indicated by the APIRM and can report the monitoring results to the macro BS in a message such as an APINM (704). In some implementations, the MS can autonomously send an APINM without receiving an APIRM.

The macro BS can determine a target FAP based on a detected special pilot sequence in the MS's APINM response. The macro BS can send a Handoff (HO) Required message to the MSC and the IMS (705). The IMS can send the HO Request message to the FAP to trigger the FAP to start null forward link traffic frames (706). The FAP can send null forward link traffic frames in response to receiving a HO Request message. The FAP can send a HO Request Acknowledgement (ACK) to the IMS and MSC (707). The MSC can send a HO Command message to macro BS (708). The macro BS can send a HO Direction message to the MS to handoff to the FAP (709). The MS can communicate with the FAP based on the HO Direction message. The MS can send a MS ACK Order message to the macro BS based on the HO Direction message (710). The MS ACK Order can trigger the macro BS to send a HO Commenced message to the MSC and the IMS (711).

The MS can transmit reverse link traffic frames to the FAP (712). The MS can send a HO Completion message to the FAP to notify the FAP that the HO process is completed (713). The FAP can send a BS ACK Order message to the MS to indicate that the FAP has received the HO Completion message from the MS (714).

The FAP can send a HO Compete message to the IMS and the MSC to notify them to release the resources for the previous connection (715). The MSC can send a Clear Command to the macro BS to remove the radio resource allocated for the call (716). The macro BS can send a Clear Complete message to the MSC after tearing down the radio connection of the previous connection (717).

Figure 8:
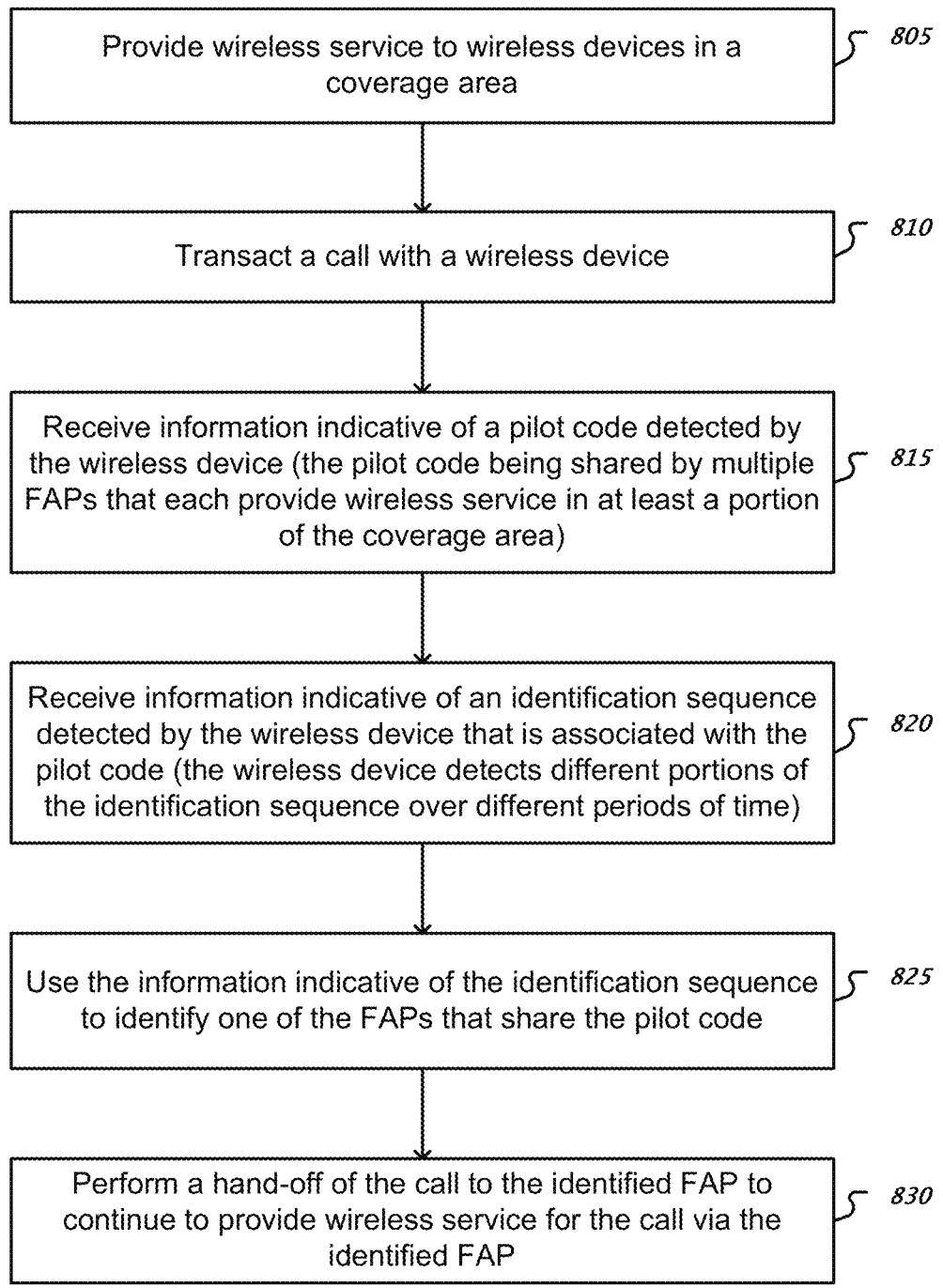
FIG. 8 shows an example of a base station process for processing identification sequence information.

FIG. 8 shows an example of a base station process for processing identification sequence information. A base station can provide wireless service to wireless devices in a coverage area (805). The base station can communicate with a wireless device and can transact a call with a wireless device (810). For example, the base station can send and receive voice call information or data call information. The base station can receive information indicative of a pilot code, e.g., a PN code, detected by the wireless device (815). The pilot code can be shared by multiple FAPs that each provide wireless service in at least a portion of the coverage area. The base station can receive information indicative of an identification sequence detected by the wireless device that is associated with the pilot code (820). The wireless device can detect different portions of the identification sequence over different periods of time. The base station can use the information indicative of the identification sequence to identify one of the FAPs that share the pilot code (825). The base station can perform a hand-off of the call to the identified FAP to continue to provide wireless service for the call via the identified FAP (830).

In some implementations, a wireless communication system can reserve some special frames or channels for FAPs to periodically transmit their identification sequences at the same time to reduce a wireless device's time spent searching for identification sequences. A wireless device can monitor for multiple identification sequences at the same time. The wireless device can report one or more detected identification sequences. In some implementations, the wireless device can report the strongest detected identification sequence.

In some implementations, a base station providing coverage in a macro cell can identify one of the FAPs sharing the pilot code in the macro cell by communicating identification sequence information to a processing device such as a server or a controller such as a BSC or an access network. For example, the base station can communicate a detected identification sequence to a controller, and in turn, can receive an identity of a FAP that corresponds to the detected identification sequence. In some implementations, a base station can include a controller.

The disclosed and other embodiments and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations may be made based on what is disclosed.

What is claimed is:

1. A method for operating a base station, comprising:
providing wireless service to wireless devices in a coverage area;
transacting a call with a wireless device;
receiving, at the base station, information indicative of a pilot code detected by the wireless device, the pilot code being shared by multiple Femto Access Points (FAPs) that each provide wireless service in at least a portion of the coverage area such that information indicative of the pilot code cannot unambiguously identify to the base station an FAP that transmitted the pilot code detected by the wireless device;
receiving, at the base station, information indicative of an identification sequence detected by the wireless device, wherein the identification sequence is transmitted by an FAP from the multiple FAPs that share the pilot code, the FAP being different from the base station, and wherein the wireless device receives the identification sequence over periods of time that are different from time periods over which the pilot code is received;
using the information indicative of the identification sequence to identify one of the FAPs that share the pilot code; and
performing a hand-off of the call to the identified FAP to continue to provide wireless service for the call via the identified FAP.

2. The method of claim 1, wherein the identification sequence comprises two or more Pseudorandom Noise (PN) sequences in two or more different transmission frames.

3. The method of claim 1, wherein the identification sequence comprises two or more Walsh codes modulated on a Pseudorandom Noise (PN) sequence over different periods of time.

4. The method of claim 1, wherein receiving information indicative of the pilot code comprises receiving information indicative of the identification sequence.

5. The method of claim 1, further comprising:
operating the FAPs to each transmit a different identification sequence; and
transmitting assistance information to the wireless device to assist the wireless device in detecting one or more identification sequences.

6. The method of claim 1, wherein receiving information indicative of the identification sequence comprises receiving a value that corresponds to a FAP.

7. The method of claim 1, wherein receiving information indicative of the identification sequence comprises receiving different time indices and information detected by the wireless device during the time periods associated the time indices.

8. A wireless communication system, comprising:
two or more Femto Access Points (FAPs) configured to provide wireless service to wireless devices in different portions of a coverage area and transmit different identification sequences, wherein the two or more FAPs share a pilot code; and
a base station in communication with the two or more FAPs, comprising:
means for providing wireless service to wireless devices in the coverage area;
means for transacting a call with a wireless device;
means for receiving information indicative of a detected pilot code from the wireless device, wherein the information indicative of the detected pilot code cannot unambiguously identify to the base station an FAP from the two or more FAP that transmitted the pilot code detected by the wireless device;
means for receiving information indicative of a detected identification sequence from the wireless device, the detected identification sequence being associated with the detected pilot code, wherein the identification sequence is transmitted by one of the two or more FAPs, wherein the wireless device detects the detected identification sequence over periods of time that are different from time periods over which the pilot code is received;
means for using the information indicative of the detected identification sequence to identify one of the two or more FAPs; and
means for performing a hand-off of the call to the identified FAP to continue to provide wireless service for the call via the identified FAP.

9. The system of claim 8, wherein the detected identification sequence comprises two or more Pseudorandom Noise (PN) sequences in two or more different transmission frames.

10. The system of claim 8, wherein the detected identification sequence comprises two or more Walsh codes modulated on a Pseudorandom Noise (PN) sequence over different periods of time.

11. The system of claim 8, wherein the means for receiving information indicative of the detected pilot code comprises the means for receiving information indicative of the detected identification sequence.

12. The system of claim 8, wherein the base station further comprises:
means for transmitting a message to at least one of the two or more FAPs to request a transmission of an identification sequence; and
means for transmitting assistance information to the wireless device to assist the wireless device in detecting one or more identification sequences.

13. The system of claim 8, wherein the means for receiving information indicative of the detected identification sequence comprises means for receiving a value that corresponds to a FAP.

14. The system of claim 8, wherein the means for receiving information indicative of the detected identification sequence comprises means for receiving different time indices and information detected by the wireless device during the time periods associated the time indices.

15. An apparatus for wireless communications, comprising:
transceiver electronics to communicate with wireless devices in a coverage area; and
processor electronics, in communication with the transceiver electronics, configured to perform operations, the operations comprising:
transacting a call with a wireless device;
operating the transceiver electronics to receive information indicative of a pilot code detected by the wireless device, the pilot code being shared by multiple Femto Access Points (FAPs) that each provide wireless service in at least a portion of the coverage area such that information indicative of the pilot code cannot unambiguously identify to the base station an FAP that transmitted the pilot code detected by the wireless device;
operating the transceiver electronics to receive information indicative of an identification sequence detected by the wireless device, wherein the identification sequence is transmitted by an FAP from the multiple FAPs that share the pilot code, the FAP being different from the base station, and wherein the wireless device receives the identification sequence over periods of time that are different from time periods over which the pilot code is received;
using the information indicative of the identification sequence to identify one of the FAPs that share the pilot code; and
performing a hand-off of the call to the identified FAP to continue to provide wireless service for the call via the identified FAP.

16. The apparatus of claim 15, wherein the identification sequence comprises two or more Pseudorandom Noise (PN) sequences in two or more different transmission frames.

17. The apparatus of claim 15, wherein the identification sequence comprises two or more Walsh codes modulated on a Pseudorandom Noise (PN) sequence over different periods of time.

18. The apparatus of claim 15, wherein receiving information indicative of the pilot code comprises receiving information indicative of the identification sequence.

19. The apparatus of claim 15, the operations further comprising:
operating the transceiver electronics to transmit a message to at least one of the two or more FAPs to request a transmission of an identification sequence; and
operating the transceiver electronics to transmit assistance information to the wireless device to assist the wireless device in detecting one or more identification sequences.

20. The apparatus of claim 15, wherein receiving information indicative of the detected identification sequence comprises receiving a value that corresponds to a FAP.

21. The apparatus of claim 15, wherein receiving information indicative of the detected identification sequence comprises receiving different time indices and information detected by the wireless device during the time periods associated the time indices.

22. An apparatus for wireless communications, comprising:
means for communicating with wireless devices in a coverage area;
means for transacting a call with a wireless device;
means for receiving information indicative of a pilot code detected by the wireless device, the pilot code being shared by multiple Femto Access Points (FAPs) that each provide wireless service in at least a portion of the coverage area such that information indicative of the pilot code cannot unambiguously identify to the base station an FAP that transmitted the pilot code detected by the wireless device;
means for receiving information indicative of an identification sequence detected by the wireless device, wherein the identification sequence is transmitted by an FAP from the multiple FAPs that share the pilot code, the FAP being different from the base station, and wherein the wireless device receives the identification sequence over periods of time that are different from time periods over which the pilot code is received;
means for identifying one of the FAPs that share the pilot code, the means for identifying one of the FAPs being responsive to the information indicative of the identification sequence; and
means for performing a hand-off of the call to the identified FAP to continue to provide wireless service for the call via the identified FAP.

23. The apparatus of claim 22, wherein the identification sequence comprises two or more Pseudorandom Noise (PN) sequences in two or more different transmission frames.

24. The apparatus of claim 22, wherein the identification sequence comprises two or more Walsh codes modulated on a Pseudorandom Noise (PN) sequence over different periods of time.

25. The apparatus of claim 22, wherein the means for receiving information indicative of the pilot code comprises the means for receiving information indicative of the identification sequence.

26. The apparatus of claim 22, further comprising:
means for transmitting a message to at least one of the two or more FAPs to request a transmission of an identification sequence; and
means for transmitting assistance information to the wireless device to assist the wireless device in detecting one or more identification sequences.

27. The apparatus of claim 22, wherein the means for receiving information indicative of the detected identification sequence comprises means for receiving a value that corresponds to a FAP.

28. The apparatus of claim 22, wherein the means for receiving information indicative of the detected identification sequence comprises means for receiving different time indices and information detected by the wireless device during the time periods associated the time indices.

29. An apparatus for wireless communications, comprising:
transceiver electronics configured to communicate with wireless devices in a coverage area and transmit a signal indicative of a pilot code, the pilot code being shared by multiple base stations that provide wireless service to wireless devices in different portions of the coverage area; and
processor electronics, in communication with the transceiver electronics, configured to perform operations, the operations comprising:

operating the transceiver electronics to receive a message requesting transmission of an identification sequence;

operating the transceiver electronics to transmit the pilot code in pilot code time slots;

operating the transceiver electronics to transmit, in response to the received message, a signal indicative of different portions of the identification sequence over periods of time that are different from the pilot code time slots to a wireless device; and operating the transceiver electronics to receive a hand-in request for a call associated with the wireless device, the hand-in request being generated in response to the transmitted signal; and operating the transceiver electronics to provide wireless service for the call in response to the hand-in request.

30. The apparatus of claim 29, wherein operating the transceiver electronics to transmit the signal comprises operating the transceiver electronics to transmit two or more Pseudorandom Noise (PN) sequences in two or more different transmission frames, wherein the identification sequence comprises the two or more Pseudorandom Noise (PN) sequences.

31. The apparatus of claim 29, wherein operating the transceiver electronics to transmit the signal comprises operating the transceiver electronics to transmit the signal responsive to two or more Walsh codes modulated on a Pseudorandom Noise (PN) sequence, wherein the identification sequence comprises the two or more Walsh codes.

32. The apparatus of claim 29, wherein the message requesting transmission of the identification request is received over a backhaul interface.

* * * * *